(12) United States Patent
Aughton et al.

(10) Patent No.: US 7,083,359 B2
(45) Date of Patent: Aug. 1, 2006

(54) CONTROL GATES

(75) Inventors: David Aughton, Hawthorn East (AU); Iven Mareels, Parkville (AU); Erik Weyer, Parkville (AU)

(73) Assignee: Rubicon Research Pty. Ltd., Surrey Hills (AU)

( * ) Notice: Subject to any disclaimer, the term of this patent is extended or adjusted under 35 U.S.C. 154(b) by 0 days.

(21) Appl. No.: 10/362,081

(22) PCT Filed: Aug. 21, 2001

(86) PCT No.: PCT/AU01/01036

§ 371 (c)(1),
(2), (4) Date: Aug. 6, 2003

(87) PCT Pub. No.: WO02/16698

PCT Pub. Date: Feb. 28, 2002

(65) Prior Publication Data

US 2004/0009041 A1    Jan. 15, 2004

(30) Foreign Application Priority Data

Aug. 21, 2000  (AU)  .................................... PQ9554
Nov. 3, 2000  (AU)  .................................... PR1217

(51) Int. Cl.
E02B 7/40 (2006.01)
E02B 7/36 (2006.01)
E02B 7/28 (2006.01)
E02B 7/54 (2006.01)

(52) U.S. Cl. ....................................... 405/100; 405/106

(58) Field of Classification Search .................. 405/87, 405/89, 92, 98, 99–101, 103–106
See application file for complete search history.

(56) References Cited

U.S. PATENT DOCUMENTS

| | | | | |
|---|---|---|---|---|
| 31,836 A | * | 3/1861 | Taylor | 405/100 |
| 109,984 A | * | 12/1870 | Whitney | 405/99 |
| 344,878 A | * | 7/1886 | Tainter | 405/100 |
| 344,879 A | * | 7/1886 | Tainter | 405/101 |
| 1,377,921 A | * | 5/1921 | Peterson | 405/101 |
| 1,455,586 A | * | 5/1923 | Hajek | 405/94 |
| 1,544,996 A | | 7/1925 | Laufer | |

(Continued)

FOREIGN PATENT DOCUMENTS

CH           188 255 A     12/1936

(Continued)

OTHER PUBLICATIONS

International Search Report, ref: PCT/AU01/01036, Nov. 19, 2001.

(Continued)

*Primary Examiner*—Sunil Singh
(74) *Attorney, Agent, or Firm*—Brown Raysman Millstein Felder & Steiner, LLP; Leah Sherry

(57) ABSTRACT

A control gate is adapted to be installed across a channel for liquids. The Control gate has a barrier member capable of vertical or tilting movement and it is either slidingly or pivotally mounted to a frame of the control gate. In one instance, the control gate has at least one side member attached to the barrier member. A drive member co-operates with the side member(s) to allow raising and lowering of the barrier member to regulate flow of liquid through the control gate. A flow control member allow the liquid to flow over the gate substantially parallel to the floor of the channel. Also described is a method of measuring flow rate through a control gate.

13 Claims, 6 Drawing Sheets

U.S. PATENT DOCUMENTS

| | | | |
|---|---|---|---|
| 2,317,975 A * | 5/1943 | Boath et al. ................ 405/100 |
| 2,909,899 A * | 10/1959 | Ramsden et al. ........... 405/100 |
| 4,022,429 A | 5/1977 | Yonekura | |
| 4,332,507 A | 6/1982 | Wakamori | |
| 4,498,809 A | 2/1985 | Farmer | |
| 4,522,534 A | 6/1985 | Wakamori | |
| 4,726,709 A | 2/1988 | Labelle | |
| 4,772,157 A * | 9/1988 | Obermeyer .................. 405/75 |
| 4,848,962 A | 7/1989 | Whipps | |
| 5,460,462 A * | 10/1995 | Regan ......................... 405/96 |
| 5,516,230 A | 5/1996 | Bargeron | |
| 5,613,803 A | 3/1997 | Parrish | |
| 5,708,211 A | 1/1998 | Jepson | |
| 5,868,159 A | 2/1999 | Loan | |
| 5,984,575 A | 11/1999 | Knott | |

FOREIGN PATENT DOCUMENTS

| | | | |
|---|---|---|---|
| CH | 640289 | * | 12/1983 |
| DE | 696 613 | | 9/1940 |
| DE | 10 80 934 B | | 4/1960 |
| DE | 11 03 857 B | | 3/1961 |
| DE | 2 247 453 | | 4/1974 |
| DE | 29 35 015 A1 | | 3/1981 |
| EP | 345180 A1 | | 12/1989 |
| FR | 2594896 A | | 8/1987 |
| FR | 2685367 A1 | | 6/1993 |
| GB | 2302723 A | | 1/1997 |
| JP | 60 088711 A | | 5/1985 |
| JP | 08120654 A | | 5/1996 |
| JP | 08326040 A | | 12/1996 |
| JP | 09221736 A | | 8/1997 |
| JP | 10159068 A | | 6/1998 |
| JP | 10183585 A | | 7/1998 |
| JP | 11241331 A | | 9/1999 |
| JP | 11-323885 | | 11/1999 |
| NL | 1 010 851 C | | 6/2000 |
| SU | 768876 A | | 10/1980 |
| SU | 983179 A | | 12/1982 |
| SU | 1113462 A | | 11/1984 |
| SU | 1283284 A | | 1/1987 |
| WO | WO 98/52002 A1 | | 11/1998 |
| WO | WO 99/58768 A1 | | 11/1999 |
| WO | WP 01/59221 A | | 8/2001 |

OTHER PUBLICATIONS

International Search Report, ref: PCT/AU02/00230, Jun. 17, 2002.

Supplemental European Search Report, Ref: 20031075, Jul. 12, 2004.

EPO Search Report, Ref: 2003142, Jan. 10, 2005.

* cited by examiner

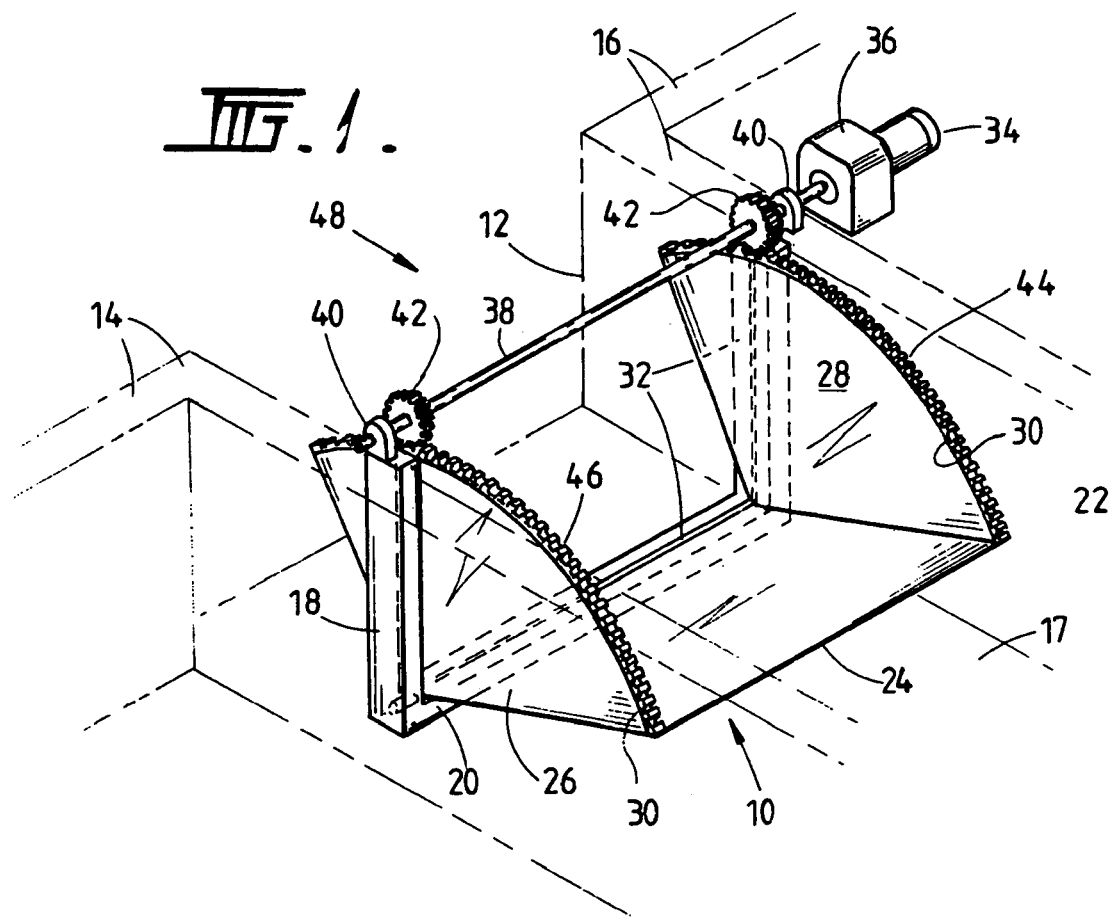
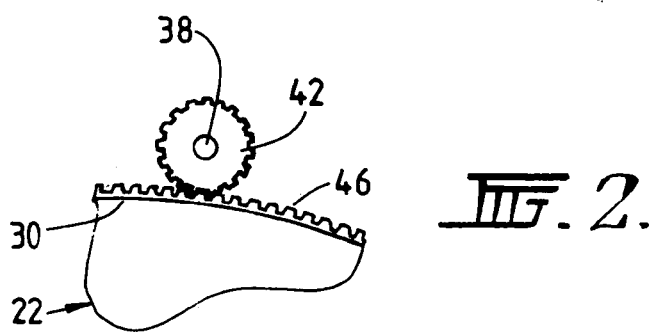
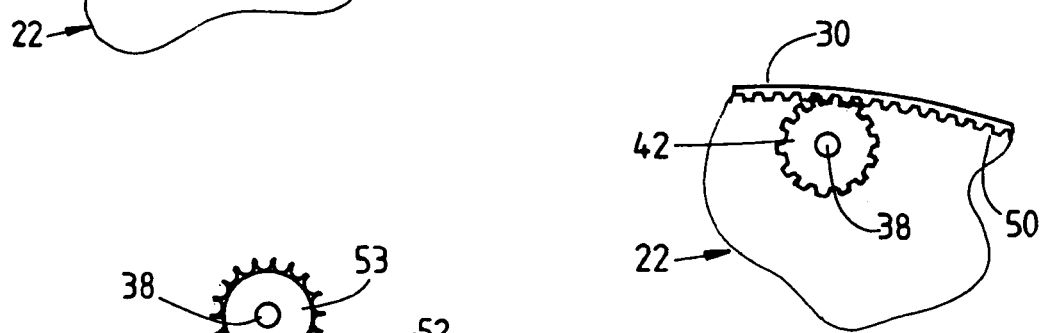
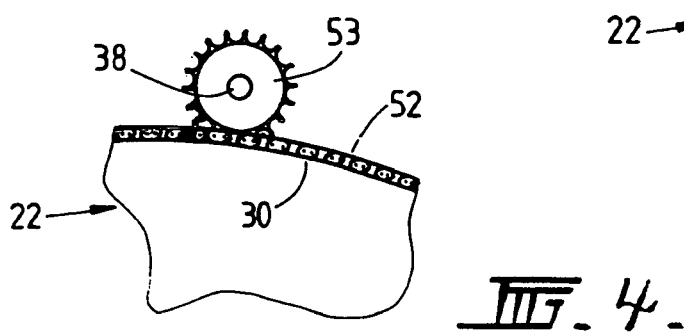

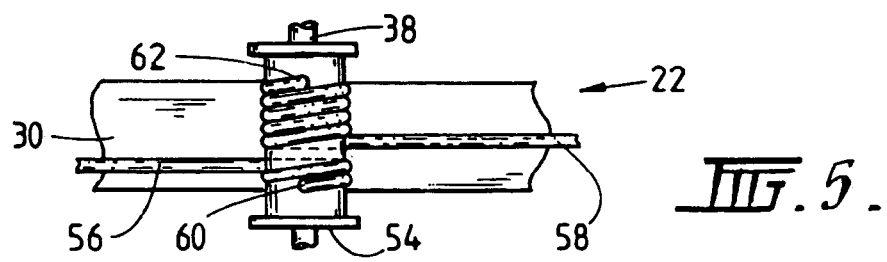
FIG. 5.
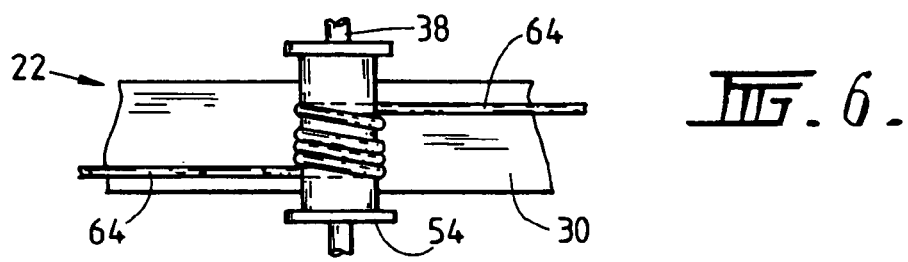
FIG. 6.
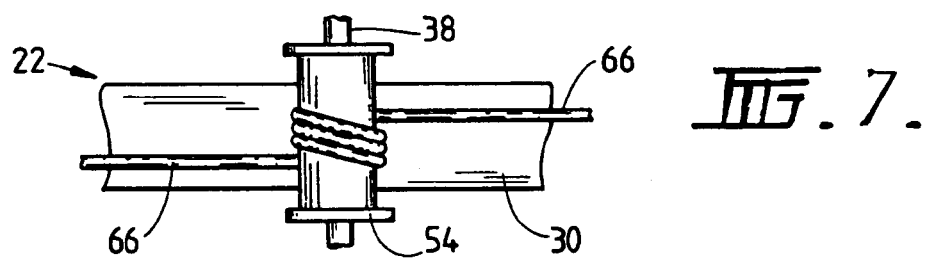
FIG. 7.
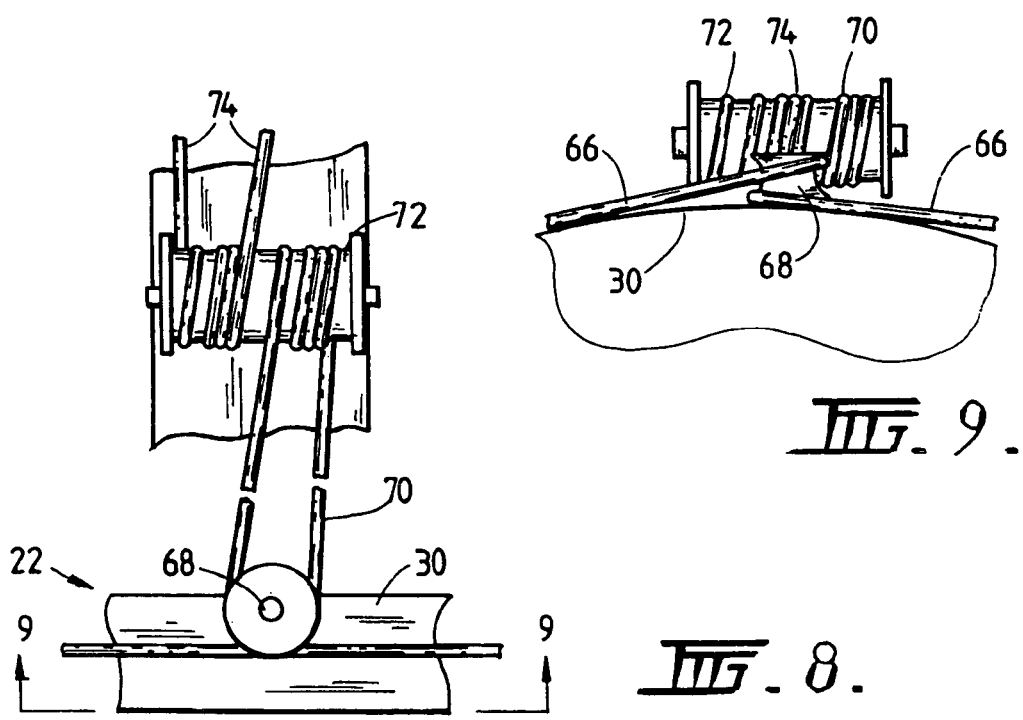
FIG. 9.
FIG. 8.

US 7,083,359 B2

CONTROL GATES

FIELD OF THE INVENTION

This application is a national phase application, under 35 USC 371, of PCT/AU010/01036 filed Aug. 21, 2001, claiming priority from Australian Application PQ 9554, filed Aug. 21, 2000 and PQ 1217, filed Nov. 3, 2000.

This invention relates to control gates for flow and level control of liquids and to lifting mechanisms for such gates.

BACKGROUND OF THE INVENTION

Control gates are commonly known for regulating the flow and level of water in water channels especially for irrigation. Control gates are typically of the vertical slide type e.g., U.S. Pat. No. 4,726,709; the radial control type e.g., U.S. Pat. No. 5,516,230; or the swing down type e.g., U.S. Pat. No. 4,073,147. Such gates have proved popular but require large motors or complex actuating devices to lift the gates against the weigh of water, the flow of the water or the weight of the gate.

SUMMARY OF THE INVENTION

It is an object of the present invention to provide a control gate which reduces the motor torque requirements to lift the control gate.

A further object of another aspect of the invention is to provide a means of measuring the flow rate through the gate.

A further object of a further aspect of the invention is to provide a control gate with associated lifting mechanism which can be assembled as a self contained unit that can be retrofitted to existing regulating structures.

A further object of the invention is to provide a lifting mechanism for control gates which can be integrated into the construction of control gates or retrofitted to existing control gates.

With these objects in view the present invention in a first aspect provides a control gate adapted to be installed across a channel for liquids, said control gate having a barrier member that is pivotally mounted at or adjacent the base of said flow channel and at least one side member or central member attached to said barrier member, a drive means co-operating with said at least one side member or central member to allow raising and lowering of said barrier member to regulate flow of liquid through said control gate.

Preferably said at least one side member or central member has a circular arcuate section which co-operates with said drive means. In one embodiment said drive means includes a rack or chain on said circular arcuate section which co-operates with a driven pinion, worm or sprocket. In a preferred embodiment two side members are provided and said side members sealingly engage with a support frame within said flow channel. In a further embodiment said drive means includes a winding spool which co-operates with at least one cable along or parallel to said circular arcuate section whereby the winding onto or off said spool of said at least one cable will cause movement of said control gate. In a further embodiment said circular arcuate section may include a flange which projects into the flow of liquid to alter the flow characteristics through said control gate.

In another aspect of the invention there is provided a lifting device for a control gate having a movable barrier member which controls flow of liquid through said control gate, said lifting device including at least one engagement member running the length of said barrier member and at least one driving member which co-operates with said at least one engagement member to cause lifting of said movable barrier on rotation of said at least one driving member.

Preferably said at least one driving member includes a pinion gear, worm drive, sprocket, spool or pulley and said at least one engagement member includes a rack, chain or at least one cable under tension.

In another aspect of the invention there is provided a moving device for controlling movement of a barrier member, said moving device including at least one engagement member running the length or a side of said barrier member and at least one driving member which co-operates with said at least one engagement member to cause movement of said barrier on rotation of said at least one driving member. Preferably said engagement member is a pair of opposing cables secured to said at least one driving member in the form of a spool member from which said cables wind off and on from said spool member. In a practical embodiment said spool member can also move axially during rotation to allow the cables to wind directly onto and off said spool member at a substantially constant position on said spool member.

In yet a further aspect of the invention there is provided a flow stabilisation device for flow control gate for the regulation of liquid flow along a channel, said flow stabilisation device including a flow direction plate pivotally attached to said control gate, said flow direction plate adapted to allow liquid passing through said control gate to exit from said control gate substantially parallel with the floor of said channel.

Preferably said flow direction plate is pivotally attached to a pivotable plate over which said liquid flows and said flow direction plate retains a substantially parallel disposition with respect to the floor of said channel. In a preferred embodiment said flow direction plate forms one side of a parallelogram with the opposing side being fixed in a position parallel to the floor of said channel.

In yet a further aspect of the invention there is provided a method for measuring flow rate of a liquid through a gate in a channel, said method including the steps of measuring the pressure of the liquid at a first position upstream of said gate, measuring the pressure of the liquid at a second position downstream of said gate, measuring the position of opening of said gate and calculating said flow rate using an algorithm based on said measurements. It is preferred that the measurements take place adjacent to the gate. Preferably said algorithm is determined using a system identification method.

In yet another aspect of the invention there is provided a device for measuring flow rate of a liquid through a gate in a channel, said device having a first pressure sensor for measuring the pressure of the liquid at a first position upstream of said gate, a second pressure sensor for measuring the pressure of the liquid at a second position downstream of said gate, an opening sensor for measuring the position of opening of said gate and computation means for calculating said flow rate using an algorithm based on said measurements.

In a further preferred aspect there is provided a control gate adapted to be installed across a channel for liquids, said control gate having a first frame member adapted to be secured to said channel, a second frame member which slidingly co-operates with said first frame member, said second frame member including a gate for controlling flow of liquid therethrough, and sealing means on said second frame member to provide sealing between said gate and said second frame member.

Preferably said sealing means is a continuous seal located on or within said second frame member. It is preferred that said continuous seal includes a plurality of parallel ribs which abut said gate to provide a positive sealing effect.

In yet a further aspect of the invention there is provided a method for measuring flow rate of a liquid through a gate in a channel, said method including the steps of providing at least one sensor in or adjacent said gate, measuring the output from said at least one sensor, and calculating said flow rate through said gate using an algorithm based on said measurements. Preferably said algorithm is determined using a system identification method. Preferably said measurements may be made using pressure, magnetic inductive, sonar or other suitable types of sensors and/or a combination of different sensors. Preferably the position of opening of said gate is also measured and this measurement is also included in the determination of said algorithm.

BRIEF DESCRIPTION OF THE DRAWINGS

In order that the invention may be more readily understood and put into practical effect, reference will now be made to the accompanying drawings, in which:

FIG. 1 is a perspective view of a control gate made in accordance with the invention;

FIG. 2 is a part side view of the control gate shown in FIG. 1;

FIG. 3 is a part side view of the control gate shown in FIG. 1 with a second embodiment of a control gate driving mechanism;

FIG. 4 is a part side view of the control gate shown in FIG. 1 with a third embodiment of a control gate driving mechanism;

FIG. 5 is a plan view of the control gate shown in FIG. 1 with a fourth embodiment of a control gate driving mechanism;

FIG. 6 is a plan view of the control gate shown in FIG. 1 with a fifth embodiment of a control gate driving mechanism;

FIG. 7 is a plan view of the control gate shown in FIG. 1 with a sixth embodiment of a control gate driving mechanism;

FIG. 8 is a plan view and side view of the control gate shown in FIG. 1 with a seventh embodiment of a control gate driving mechanism;

FIG. 9 is a cross-sectional view along and in the direction of arrows 9—9 of FIG. 8;

FIGS. 15 to 19 illustrate a variation of the control gate shown in FIG. 1 showing the assembly sequence of the control gate; FIG. 15 is a perspective view showing the fitting of the sealing member to the support frame;

FIG. 16 is a perspective view showing the outer frame receiving the support frame with barrier member pivotally attached thereto;

FIG. 17 is a cross-sectional view along and in the direction of arrows 17—17 shown in FIG. 16 but including the outer frame;

FIG. 18 is a side view showing the sealing of the barrier member to the sealing member of the control gate shown in the direction of arrow 18—18 of FIG. 16; and FIG. 19 is a similar view to that of FIG. 1 showing a further embodiment of the invention.

DETAILED DESCRIPTION OF THE INVENTION

Figure 10:
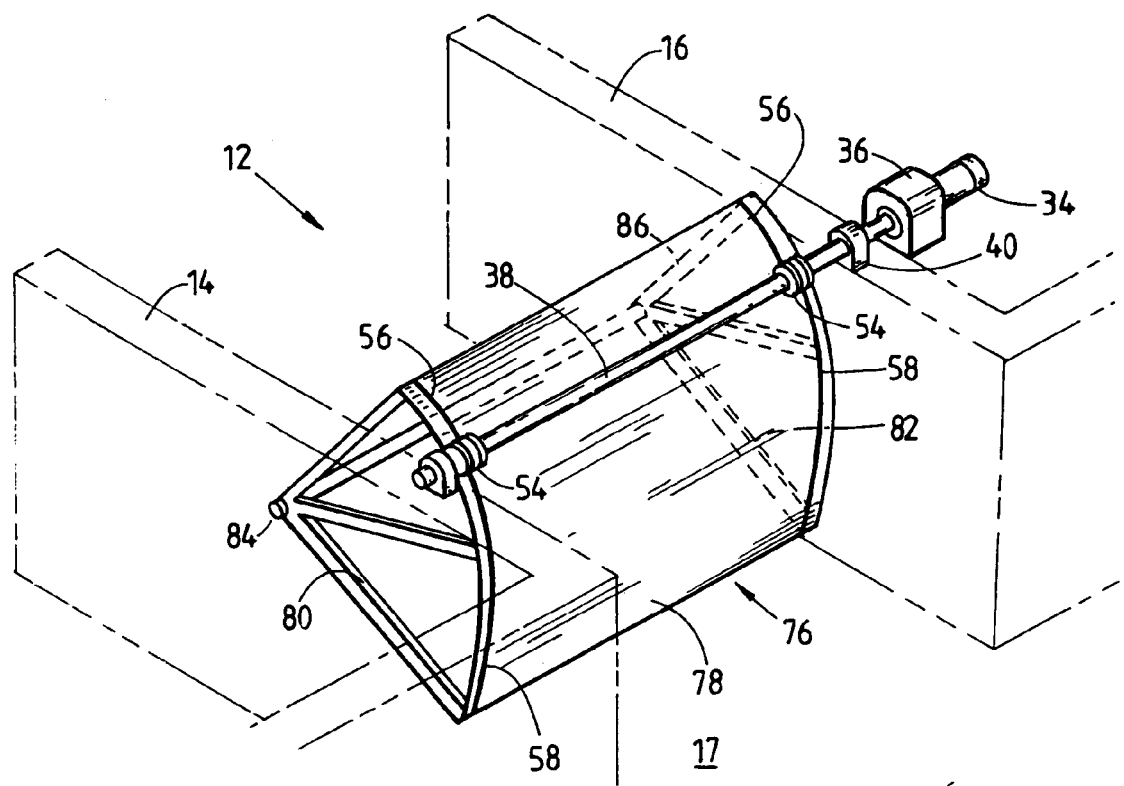
FIG. 10 is a perspective view of a control gate having the control gate mechanism as shown in FIG. 5.

Throughout the description and drawings the same reference numerals have been used for similar integers to avoid repetition of description. In FIGS. 1 and 2 of the drawings there is shown a control gate 10 for controlling the flow of water through a channel 12. Channel 12 can be a drain, irrigation channel or other water course where flow must be regulated. In this embodiment channel 12 has a pair of side walls 14, 16 and a floor 17 in the form of a U-shaped channel. Although a U-shaped channel is shown the channel could be of any shape e.g. circular, trapezoidal or other shape. The channel 12 is preferably formed of concrete to provide ease of construction and a smooth flow of water. Preferably slots (not shown) are cut into opposing side walls 14, 16 for reception of a support frame 18 of control gate 10. Support frame 18 is U-shaped and will slide into the slots for an easy installation. Support frame 18 interlocks with the slots or other frame to provide structural stability for the assembly. Barrier member 22 is pivotally mounted to support frame 18. Barrier member 22 is formed from a bottom plate 24 and a pair of circular arcuate side plates 26, 28. Barrier member 22 can pivot to a fully closed position where bottom plate 24 is substantially vertical to a fully open position where bottom plate 24 is substantially horizontal.

By positioning bottom plate 24 in a position between the fully open and close positions the rate of flow of water can be controlled. Side plates 26,28 have a right angular section with a circular arcuate section 30 along the hypotenuse. The right angular section can be substituted by more or less of an angle of 90°, if required. Bottom plate 24 is rectangular or square depending on the dimensions of channel 12. Seals 32, e.g., seal strips, run along the length of the support frame 18 to provide a water tight seal with barrier member 22 and prevent water bypassing flow through barrier member 22. In a practical embodiment a continuous seal strip is provided on either side of the pivot for barrier member 22 and is fixed within support frame 18 and extend the full length of support frame 18.

In order to control the flow rate accurately a motor 34 is used to lift barrier member 22. Motor 34 can be monitored by a circuit means (not shown) to determine the positioning of barrier member 22 or by a switch (not shown) for manual operation. Motor 34 is coupled to a reduction gear box 36 which has an output shaft 38 supported by bearings 40 on either side of channel 12. Pinion gears 42 are secured to shaft 38 and mesh with a racks 44,46 on the outer periphery of respective side plates 26,28. The pinion gears 42 are directly located above the pivot point for barrier member 22. The arrangement of the racks 44,46 and pinion gears 42 provides a great mechanical advantage which allows smaller capacity motors 34 to be used in view of the lower torque requirement needed to lift barrier member 22.

In use, motor 34 is preferably monitored by a control panel (not shown) to which a plurality of control gates 10 may be connected. Motor 34 can be selected or deselected to control the angle of bottom plate 24 with respect to the floor 17 of channel 12. By having pressure sensors (not shown) in the channel, the flow of water through control gate can be measured and varied by the lifting of bottom plate 24 by the rack and pinion action of racks 44, 46 with pinion gears 42 with rotation of shaft 38 by motor 34 under monitoring from the control panel. It is preferred that a pair of pressure sensors are used and that they are mounted on the support frame 18 upstream and downstream, respectively. These sensors can be placed anywhere on the support frame but preferably adjacent the bottom thereof on the side of support frame 18. With the measurements from the pair of pressure sensors together with the measurement of the gate opening, the flow rate can be calculated by a computational means within said control panel using the known technique of "system identification". The expression "system identification" used in this specification refers to the known technique of deriving a system model from experimental data. It consists of suggesting a suitable mathematical representation for the model of the system of interest, followed by a tuning process in which the particular representation is optimised as to reproduce as closely as possible experimental timed observations from the system. The methodology provides a means of comparing different models and ranking them according to their ability of reproducing the system's behaviour. System identification is a particular sub-topic in mathematical system theory and also in statistics. The technique of system identification will allow development of a specific relationship for each gate in a multiple gate system. Water will flow in the direction indicated by arrow 48 and flow over bottom plate 24 in the position shown in FIG. 1. When bottom plate 24 is vertical all flow will be stopped as bottom plate 24 will block all flow. Seals 32 will ensure that there is no seepage between support frame 18 and barrier member 22.

FIG. 3 shows a similar embodiment to that shown in FIG. 2 but rack 50 is located to the side of the circular arcuate section 30 as part of a flange and pinion gear 42 is located below rack 50.

FIG. 4 shows a similar embodiment to that shown in FIG. 2 except that rack 46 has been replaced by a chain 52 along the periphery of circular arcuate section 30 and pinion gear 42 has been replaced by a sprocket 53. A worm drive could also replace pinion gear 42 and a worm track could replace rack 50.

FIG. 5 shows a similar embodiment to that of FIG. 1 but pinion gear 42 has been replaced by a spool 54 and rack 50 has been replaced by cables 56,58. Cable 56 is guided along the peripheral edge of circular arcuate section 30 and is secured at one end of barrier member 22 and at the other end 60 to spool 54, after looping therearound. Similarly cable 58 is guided along the peripheral edge of circular arcuate section 30 and is secured at the opposite end of barrier member 22 and at the other end 62 to spool 54, after looping therearound. The positioning of cables 56,58 could be by the use of a channel on circular arcuate section 30 or a flange thereon. Rotation of spool 54 by shaft 38 will cause lifting of barrier member 22 by either cable 56 being unwrapped from spool 54 whilst cable 58 is wrapped onto spool 54 or vice versa. Spool 54 is located very close to circular arcuate section 30 and under tension to ensure that cables 56,58 do not lift from their peripheral contact therewith and maximize the mechanical advantage obtained from this positioning.

FIG. 6 shows a similar embodiment to that of FIG. 5 but there is only one cable 64 which is secured at each end of circular arcuate section 30 and to spool 54. Rotation of spool 54 will lengthen or shorten the opposing sides of cable 64 from spool 54 depending on the direction of rotation.

FIG. 7 shows a similar embodiment to that of FIG. 5 but there is only one cable 66 which is secured at each end of circular arcuate section 30. Cable 66 is looped around spool 54 under tension for a couple of turns to provide sufficient frictional force to avoid slippage of cable 66 on spool 54.

FIG. 8 shows a similar embodiment to that of FIG. 7 except that spool 54 is replaced by a pulley 68 which is driven by a continuous cable 70 which wraps around a central spool 72 under tension. Central spool 72 is driven by motor 34. Central spool 72 also has a similar continuous cable 74 for coupling to opposing side plate 28.

In the embodiments shown in FIGS. 5 to 8 spools 54, 72 may also be axially movable during rotation to allow the cables to be positioned on the spools at a substantially constant axial position along the spools. Such axial movement of spools 54,72 will provide a smooth laying on or laying off of the cables from the spools 54,72.

FIG. 10 illustrates how the lifting mechanisms shown in FIGS. 1 to 9 can also be used for a standard radial gate 76. Radial gate 76 has a part cylindrical plate 78 which in its closed position will rest on the floor 17 of channel 12. Side frames 80, 82 are joined along opposing peripheries of plate 78 to complete radial gate 76. Pivots 84,86 on side frames 80,82 co-operate with side walls 14, 16 of channel 12 to allow radial gate 76 to pivot upwardly and allow water to flow thereunder. Seals (not shown) are provided on the lower edge of plate 78 and on both circular edges of plate 78 to ensure there is no seepage through the gate. This embodiment shows the use of the lifting mechanism shown in FIG. 5. Cables 56,58 are secured at each end of plate 78 and extend along the outer surface of plate 78.

Figure 11:
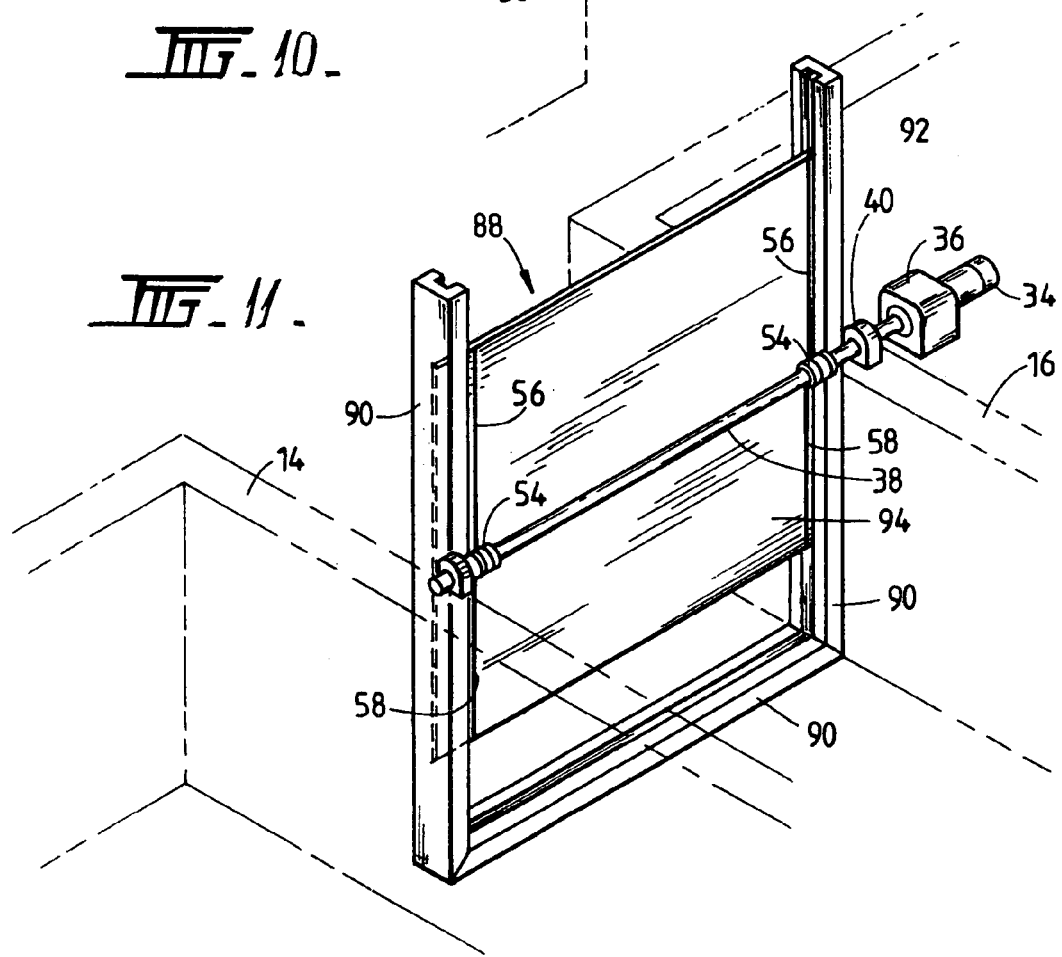
FIG. 11 is a perspective view of a second type of control gate having the control gate mechanism as shown in FIG. 5.

FIG. 11 illustrates how the lifting mechanisms shown in FIGS. 1 to 9 can also be used for a standard vertical slide gate 88. Slide 90 can be moved up and down within U-shaped frame 92 which is affixed to the side walls 14, 16 of channel 12. Frame 92 extends above channel 12 to provide guidance for slide 90 when it is fully raised. Water can flow through the gap 94 formed between the bottom of frame 92 and the bottom of slide 90. Seals (not shown) are provided within frame 92 to ensure there is no seepage through gate 88.

Figure 12:
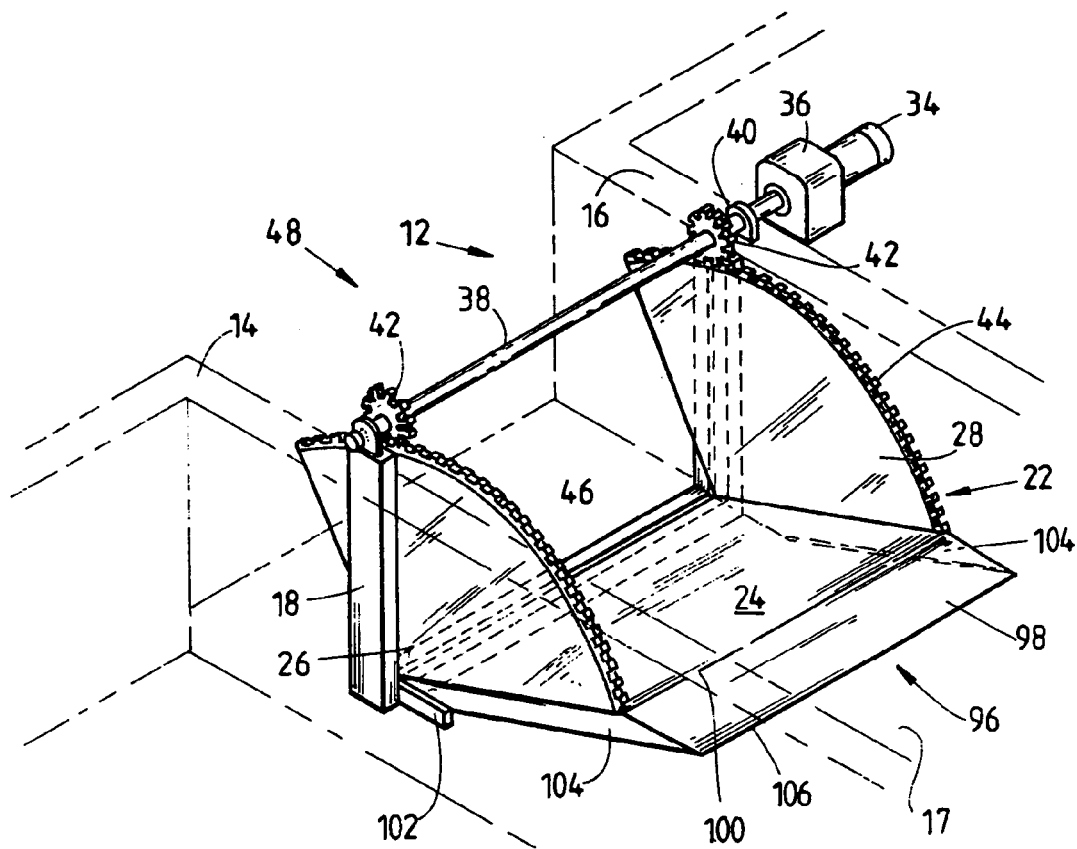
FIG. 12 is a perspective view of the control gate shown in FIG. 1 having a flow stabilization device.
Figures 13, 14:
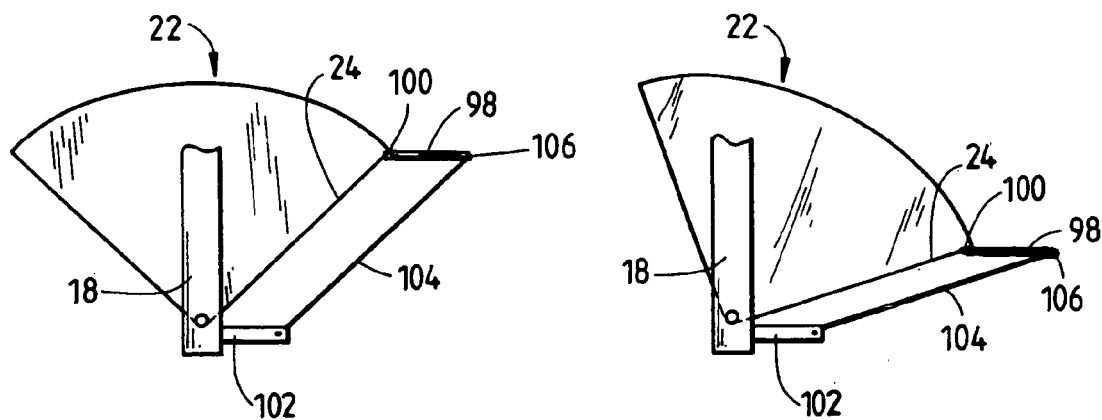
FIG. 13 is a side view of the control gate shown in FIG. 12 with the gate shown in a closed flow mode.
FIG. 14 is a side view of the control gate shown in FIG. 12 with the gate shown in an open flow mode.

FIGS. 12 to 14 show the same embodiment shown in FIGS. 1 and 2 but with the addition of a flow stabilization device 96. In this embodiment the flow stabilization device 96 is a plate. 98 which extends the full width of the bottom plate 24. Plate 98 is pivotally mounted to bottom plate 24 by hinge 100. A pair of extension arms 102 (only one shown) extend parallel to the floor 17 of channel 12 and are the same width as the width of plate 98. A pair of rods or links 104 are pivotally attached at either end to a respective extension arm 102 and the free edge 106 of plate 98. Rods or links 104 will be the same length as the bottom plate 24. Thus the side edge of bottom plate 24, the plate 98, a respective rod or link 104 and a respective extension arm 102 will form a movable parallelogram. As extension arms 102 are fixed in their parallel relationship with floor 17 of channel 12 then plate 98 will also be in a substantial parallel relationship with floor 17 when bottom plate 24 is lifted. Without plate 98 water will flow over bottom plate 24 and create turbulence where it leaves bottom plate 24 to exit the control gate. Plate 98 will maintain a horizontal flow path for the water as it exits the control gate. FIGS. 13 and 14 show a closed flow rate and open flow rate respectively and it can be clearly seen that the horizontal flow path is maintained at any flow rate. Plate 98 will reduce the turbulence one would normally expect when water exits a flow control gate.

Figure 15:
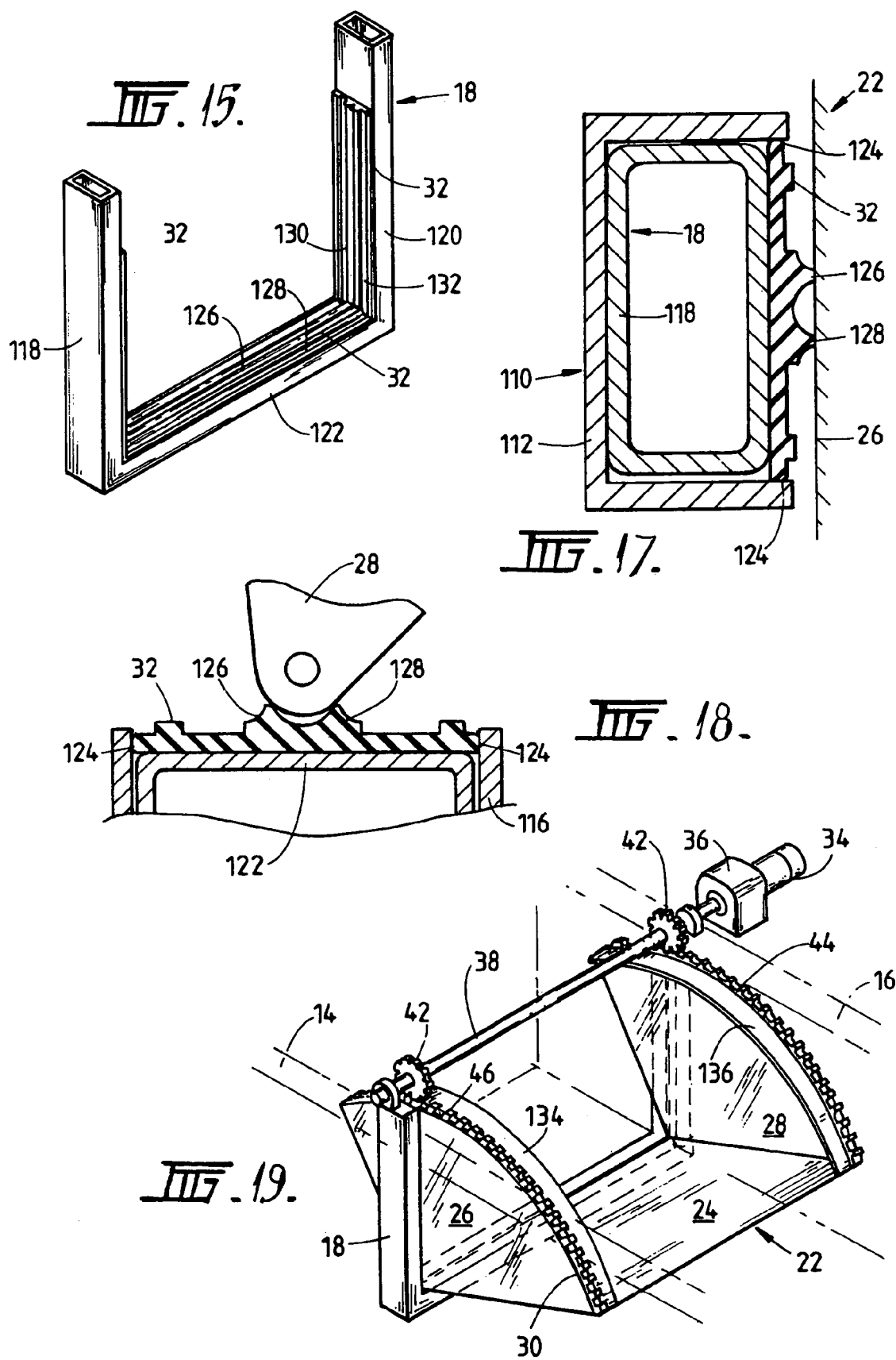
Figure 16:
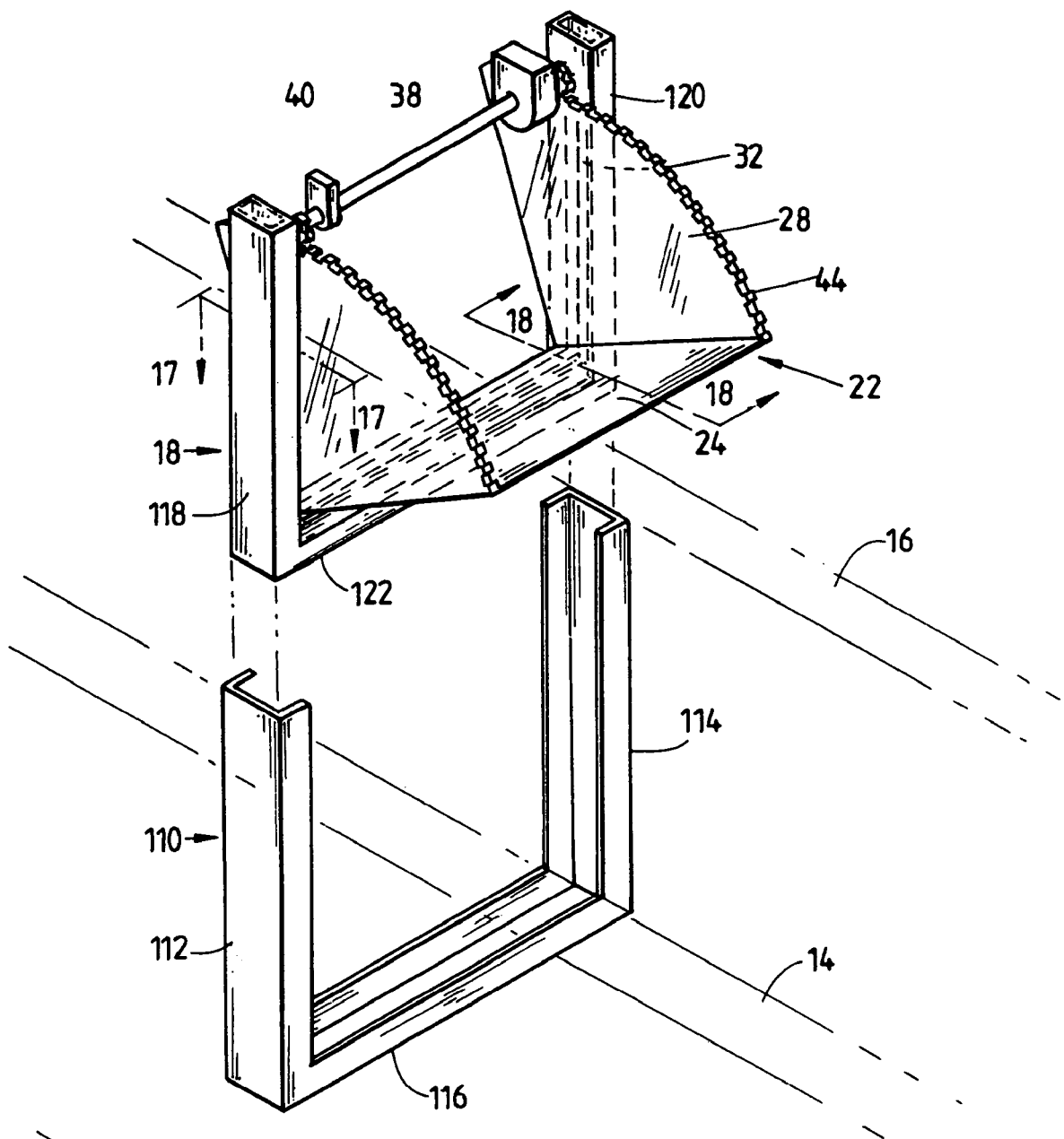

In the embodiment shown in FIGS. 15 and 16 the assembly of the control gate 10 is illustrated. An outer frame 110 replaces the slots in channel 12 for reception of support frame 18. Outer frame 110 is a U-shaped structure with vertical sections 112,114 and a bottom section 116. Sections 112,114,116 have a U-shaped profile and are secured to the side walls 14, 16 and bottom 17 of channel 12. The securement can be by fasteners, adhesive or any other suitable means. Outer frame 110 is grouted, sealed by silicone type sealers or other waterproofing agents to prevent seepage between channel 12 and outer frame 110. Support frame 18 as previously described has barrier member 22 pivotally attached thereto. Support frame 18 in this embodiment is formed as a hollow square or rectangular section and has side arms 118,120 which join with bottom arm 122. The shape of support frame 18 and outer frame 110 are not limited to the shapes shown in the preferred embodiments as they can vary to suit requirements.

Interlocking extrusions, circular or triangular shapes may be used as examples. Seal 32 is mounted as a continuous strip to the inner facing surfaces of side arms 118,120 and bottom arm 122. Seal 32 preferably extends over the opposing edges of support frame as seen at 124 (FIG. 17). This overhang 124 will provide a seal between outer frame 110 and support frame 18 to prevent seepage therebetween. Seal 32 can be of any suitable profile but the preferred embodiment has a pair of parallel ribs 126,128 which provide a very effective seal with barrier member 22. The double rib will provide an excellent double seal for the pivot point of barrier member 22 as shown in FIG. 18 and for the side plates 26,28.

In use, support frame 18 with barrier member 22 fitted thereto, will be guided into position into vertical sections 112,114 and into sealing engagement with bottom section 116. The overhangs 124 will ensure that there is no seepage between outer frame 110 and support frame 18. Support frame 18 will then be interlocked to outer frame 110. If barrier member 22 needs to be repaired, or a different type of barrier member fitted (e.g. a radial gate as shown in FIG. 10 or vertical slide control gate as shown in FIG. 11), it is any easy matter to withdraw support frame 18 with barrier member 22.

Pressure sensors 130,132 (FIG. 15) are located upstream and downstream of control gate 10 and preferably on support frame 18. In the preferred embodiment pressure sensors 130, 132 are located at a point immediately upstream of seal 32 and a point immediately downstream of seal 32 i.e. either side of ribs 126,128. The type of sensors used can vary to suit the nature of the flow rate to be measured and the invention is not limited to the type of sensor used, its position or the number of sensors used.

The embodiment shown in FIG. 19 is a variation of the embodiment shown in FIG. 1. The addition of a curved flange plate 134,136 on the circular arcuate section 30 of each side plate 26,28 will alter the flow characteristics of the liquid passing through the control gate. Curved flange plates 134,136 are mounted perpendicular to the plane of side plates 26,28 and extend inwardly therefrom. The change in flow characteristics has been found to increase the sensitivity of pressure measurements by the pressure sensors.

Although the preferred embodiments have been described with reference to the flow of water it will be apparent that the invention can be used for many different liquids and slurries. The preferred embodiments show the use of a pair of pinion gears 42 or spools 54 the invention will work with one or more than two of such integers. The use of a pair of pinion gears or spools 54 provides a better balance for lifting the control gates. Side plates 26,28; 80,82 could be substituted by a centrally located plate. The flow measurement method has the pressure sensors on support frame 18 but they can be positioned to other suitable positions to suit computational requirements.

Further embodiments of the invention will now be described with particular reference to FIG. 16 but is not limited to that Example. The pressure sensors of FIG. 16 can be omitted and a substitute system of flow rate determination can be used. Electromagnetic or sonar devices can be included in such a system. For the electromagnetic system the concept is that any conductive liquid passing through a magnetic field will induce a voltage which can be measured. This method is based on Faraday's law of induction. The amplitude of the induced voltage is related to the velocity of the liquid. The flow rate through the gate can be derived from these measurements using system identification techniques. Bottom plate 24 and side plates 26, 28 can include suitable devices to induce a magnetic field and to measure the induced voltages. Sonar techniques may also be used using either the Doppler effect or the direct travel time method. In the Doppler effect method an acoustic signal is transmitted into the moving liquid and the change in the frequency of the signals reflected from the particles of the liquid is measured. The frequency distribution of the frequency shift of the reflected signals is related to the velocity of the liquid. In the direct travel time method pairs of transmit and receive acoustic sensors are located in opposite boundaries of the moving liquid. The sensors are oriented so that the direction of the acoustic path between them is aligned to transmit to the opposite sensor and to also receive a signal from the opposite sensor. The sensors are positioned such that the path between the sensors traverses the liquid flow direction at an angle other than perpendicular. The time of the signal to travel in either direction is measured. The difference in travel time is directly related to the velocity of the liquid between the two sensor points. Additional pairs of sensors may be used to build up a profile of the liquid velocities.

The measurements made and the use of system identification methods will determine whether additional sensors are used. A number of different sensors of the same type or different type can be used in combination which has the potential of improving the flow rate measurement algorithm. One type of sensor may measure high flow rates better than low flow rates and the different sensors may be weighted when deriving the relationship under system identification. The pressure sensors of the embodiment shown in FIG. 15 can also be integrated into such a system, if required.

The invention will be understood to embrace many further modifications as will be readily apparent to persons skilled in the art and which will be deemed to reside within the broad scope and ambit of the invention, there having been set forth herein only the broad nature of the invention and certain specific embodiments by way of example.

The invention claimed is:

1. A control gate adapted to be installed across a channel for liquids, the control gate comprising a barrier member with at least one side member, the barrier member being pivotally mounted at or adjacent the base of the channel, a drive member co-operating with the at least one side member to allow raising and lowering of the barrier member to regulate flow of liquid through the control gate, and a flow stabilization device including a flow direction plate pivotally attached to the barrier member and adapted to retain a substantially parallel disposition with respect to the floor of the channel so as to allow flow of liquid through the control gate substantially parallel to the floor of the channel, wherein, being retained in the substantially parallel disposition, the flow direction plate forms one side of a parallelogram the opposite side of which being formed by an arm fixed in a position substantially parallel to the floor of the channel.

2. The control gate of claim 1, wherein the at least one side member has a circular arcuate section which co-operates with the drive member.

3. The control gate of claim 2, wherein the drive member includes a rack or chain on the circular arcuate section which co-operates with a driven pinion, worm or sprocket.

4. The control gate of claim 2, wherein the drive member includes a winding spool which co-operates with at least one cable along or parallel to the circular arcuate section whereby the winding onto or off the winding spool of the at least one cable will cause movement of the barrier member.

5. The control gate of claim 4, wherein the winding spool is movable axially during rotation to allow cables to wind around the winding spool at a substantially constant axial position thereon.

6. The control gate of claim 2, wherein the circular arcuate section includes a flange which projects into the flow of liquid to alter the characteristics of liquid flow through the control gate.

7. The control gate of claim 1, further comprising a support frame to which the at least one side member is sealingly engaged within the channel.

8. The control gate of claim 1, further including a first pressure sensor for measuring the pressure of the liquid at a first position upstream of the barrier member, a second pressure sensor for measuring the pressure of the liquid at a second position downstream of the barrier member, an opening sensor for measuring the position of opening of the barrier member and computation means for calculating the rate of the flow based on the measurements.

9. The control gate of claim 8, wherein the flow rate calculation uses a system identification method.

10. The control gate of claim 1, further including first and second sensors located, respectively, upstream and down stream of the barrier member for measuring velocity of the liquid in the channel, each of the first and second sensors being one or more of pressure, electromagnetic, or sonar sensors, a third sensor for measuring opening positions of the barrier member and computation means for processing the measurements.

11. The control gate of claim 1, further comprising a first frame member adapted to be secured to the channel and a second frame member slidingly received by the first frame member, the barrier member being pivotally attached to or slidingly inserted into the second frame member, a first sealing member between the barrier member and the second frame member, and a second sealing member between the first and second frame members.

12. The control gate of claim 11, wherein the first and second sealing members are each a continuous seal abutting or attached to the second frame member.

13. The control gate of claim 12, wherein the continuous seal includes a plurality of parallel ribs to provide a positive sealing effect.

* * * * *

UNITED STATES PATENT AND TRADEMARK OFFICE
CERTIFICATE OF CORRECTION

| | | |
|---|---|---|
| PATENT NO. | : 7,083,359 B2 | Page 1 of 1 |
| APPLICATION NO. | : 10/362081 | |
| DATED | : August 1, 2006 | |
| INVENTOR(S) | : David Aughton, Iven Mareels and Erik Weyer | |

It is certified that error appears in the above-identified patent and that said Letters Patent is hereby corrected as shown below:

At Col. 1, line 8 "PQ 1217" should read -- PR 1217 --

Signed and Sealed this

Twenty-second Day of May, 2007

JON W. DUDAS
*Director of the United States Patent and Trademark Office*